United States Patent [19]
Klier

[11] 3,899,866
[45] Aug. 19, 1975

[54] LAWN MOWER

[76] Inventor: Werner Adolph Klier, 200 E. Bonner, San Antonio, Tex. 78214

[22] Filed: June 6, 1974

[21] Appl. No.: 477,474

[52] U.S. Cl. .................................. 56/13.8; 56/505
[51] Int. Cl. ........................................ A01d 35/24
[58] Field of Search... 56/13.6, 13.8, 13.9, 249–255, 56/500–505, 249–254

[56] References Cited
UNITED STATES PATENTS

| | | | |
|---|---|---|---|
| 2,535,122 | 12/1950 | Day | 56/13.8 |
| 2,956,386 | 10/1960 | Memann | 56/13.8 |
| 3,083,518 | 4/1963 | Hultquist | 56/13.8 |
| 3,191,367 | 6/1965 | Schwalm | 56/13.8 |

*Primary Examiner*—Russell R. Kinsey

[57] ABSTRACT

A lawn mower comprising a housing supported by wheels located adjacent the corners thereof, power means mounted on the housing, a reel-type cutting member rotatably mounted within the housing and extending substantially transversely thereof, a shredder member rotatably mounted on the housing and extending substantially transversely thereof, the shredder member being located rearwardly of the reel-type cutter member, and an assembly drivingly connecting the cutter and shredder members to the power means. The cutter and shredder members are enclosed within a subhousing mounted within the housing. The shredder member is provided with a plurality of vane members for the purpose of creating a partial vacuum within the subhousing to create a suction effect at the front portion of the subhousing adjacent the cutter member which causes the grass to be lifted up for uniform cutting. The grass cuttings are sucked into the subhousing and moved rearwardly between the shredder member and a bed or plate member which forms a part of the subhousing and is adapted to be engaged by shredder blades on the shredder member to shred the grass cuttings. Thereafter, the shredded grass cuttings are blown rearwardly through a discharge chute to the rear of the mower, owing to the rearward air flow created by the vanes or fins on the shredder member.

12 Claims, 7 Drawing Figures

LAWN MOWER

THE BACKGROUND OF THE INVENTION

This invention relates to a lawn mower of the reel type and, more particularly, to such a lawn mower which effectively shreds the grass cuttings and blows them to the rear portion of the mower for discharge.

Heretofore, the lawn mowers in common use have been of three major types, namely, the reel, the rotary and the flail or hammer type. In the reel type of mower, a plurality of helically curved blades operate against a shear plate to cut the grass. Careful sharpening and adjustment to maintain a uniform contact or close clearance between the blades and the shear plate across the entire width of the reel are required for good mowing, thereby involving some time and expense in maintenance. Also, tall grass and weeds are not easily cut by reel mowers; it is difficult to cut close to fence lines, trees or buildings; reel mowers have been generally unattractive in appearance, and have been somewhat difficult to handle when self-propelled.

The rotary mower comprises a vertical shaft with a blade horizontally affixed to the bottom end thereof. The shaft is turned at high speed to sever the grass and throw it clear of the mower. Sharpening is generally simpler than for the reel mower, and tall grass and weeds can be mowed fairly readily with a rotary mower. Although all power operated mowers are inherently dangerous, the rotary mower is especially so owing to the fact that the tip velocity of the blade often exceeds 20,000 feet per minute, endangering the feet or hands of a careless user and throwing objects such as stones with great velocity. Also, the rotary mower does not produce the clean cut of the reel-type mower.

The flail or hammer mower operates on the principle of flailing the grass with a rotating flail or hammer. In general, it cuts tall grass better than a reel mower and is less dangerous than the rotary mower. However, it is not widely used for ordinary lawn mowing where appearance is important.

It will be readily seen, therefore, that a need has arisen for a lawn mower which combines the advantages of the previously used mowers and is not subject to any of their significant disadvantages.

SUMMARY OF THE INVENTION

The lawn mower of the present invention basically employs a reel-type cutting member and a shredder member mounted within a housing of the type that has been used for rotary mowers. The mower generally comprises a housing having depending side walls and four wheels rotatably mounted on the side walls adjacent the corners of the housing, a reel-type cutting member rotatably mounted on the housing and extending generally transversely thereof, a shredder member rotatably mounted on the housing and extending generally transversely thereof, the shredder member being located rearwardly of the reel-type cutting member, and power means, such as an engine or motor, mounted on the housing and drivingly connected to the cutting member and the shredder member for the purpose of rotatably driving them.

The cutting member and the shredder member are enclosed by a subhousing mounted within the housing, and the shredder member is provided with a plurality of vane members or fins for the purpose of creating an air flow or suction within the subhousing. The lower portion of the subhousing is formed by a shear plate located adjacent the lower portion of the cutting member, the shear plate being pivotally mounted on the housing so as to be adjustable relative to the cutting member; a plate member extending from the shear plate rearwardly toward the shredder member; and a shredder bed or plate that is disposed beneath the shredder member and adapted to be engaged by shredder blades on the shredder member. The shredder bed is adjustably mounted on the housing so as to be moved substantially vertically relative to the shredder member for the purpose of maintaining the shredder blades in proper engagement therewith to properly shred the grass cuttings. The subhousing terminates in a discharge chute which extends from the rear portion of the shredder member to the rear of the housing.

The air flow created by the vane members or fins of the shredder member creates a suction action at the lower portion of the cutting member so that the grass is lifted for uniform cutting and the grass cuttings are sucked into the subhousing toward the shredder member. Thereafter, the grass cuttings are shredded between the shredder blades and the shredder plate and finally are discharged rearwardly through the discharge chute to the rear of the mower. The shredded grass cuttings may be discharged directly onto the lawn at the rear of the mower for the purpose of serving as a mulch or, alternatively, may be received in a grass catcher removably mounted on the rear of the mower.

DESCRIPTION OF THE PREFERRED EMBODIMENT

Figure 1:
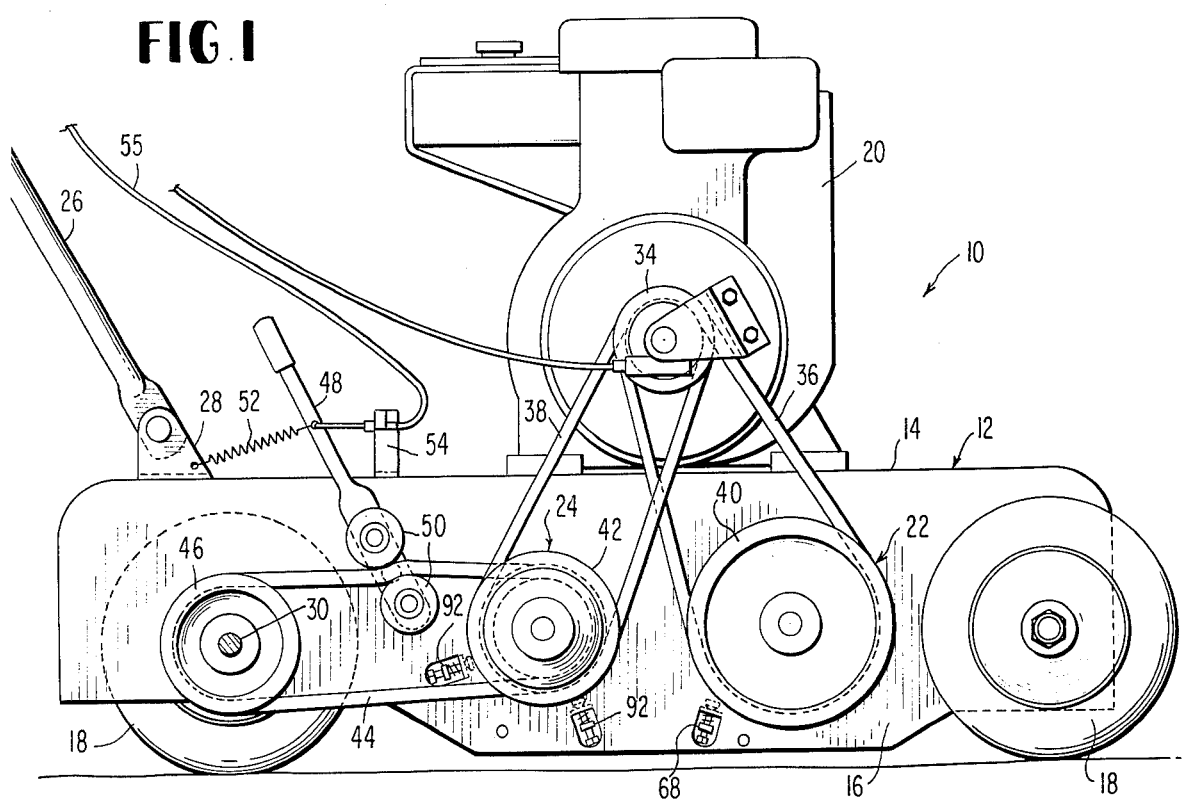
FIG. 1 is a side elevational view of a lawn mower constructed in accordance with the principles of the present invention.
Figure 2:
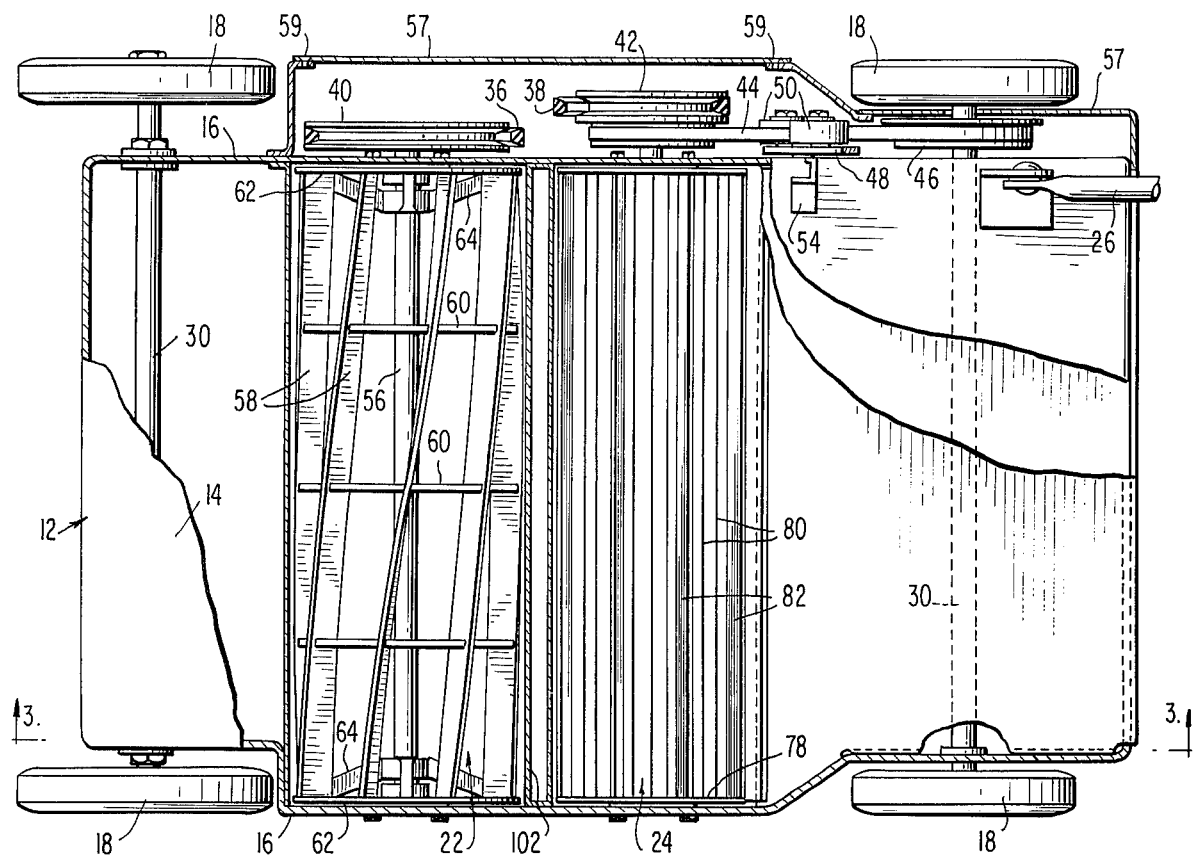
FIG. 2 is a top plan view, with parts broken away and shown in section, of the lawn mower shown in FIG. 1.
Figure 3:
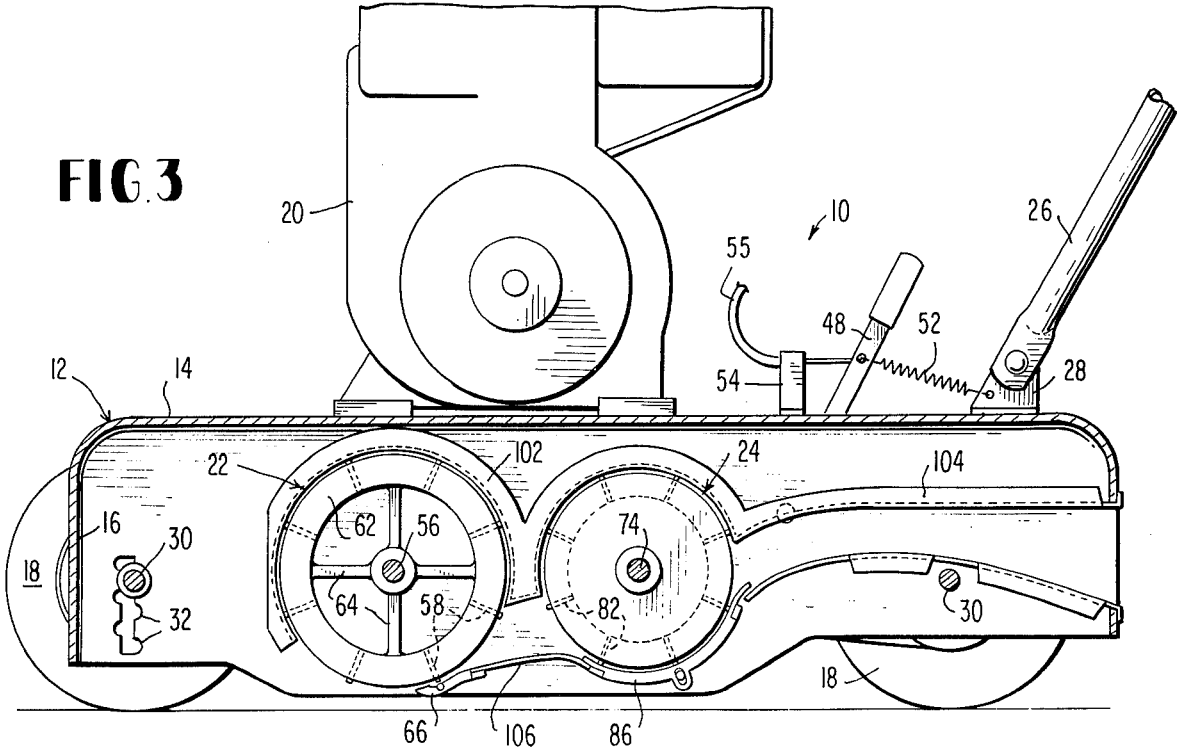
FIG. 3 is a sectional view taken substantially along line 3—3 in FIG. 2.

As shown in FIGS. 1 through 3, the lawn mower 10 of the present invention generally comprises a housing 12 of the rotary mower type having an upper wall 14, depending side walls 16 and wheels 18 rotatably mounted thereon adjacent the four corners thereof; a power means 20 of any suitable type mounted on the upper wall 14 of the housing 12; a reel-type cutting member 22 disposed within the housing and rotatably mounted thereon near the front wheels 18; a shredder member 24 disposed within the housing 12 and rotatably mounted thereon between the cutting member 22 and the rear wheels 18; and means of any suitable type for drivingly connecting the power means 20 with the cutting member 22 and the shredder member 24.

The mower 10 also comprises an elongated handle 26 of any suitable or conventional construction which is pivotally connected at its lower ends to brackets 28 secured to the upper wall 14 of the housing 12. The upper portion of the handle 26 (not shown) may comprise any type of suitable manual control means, such as handles or the like, for regulating the operation of the power means 20 or for controlling the transfer of power from the power means to the cutter member 22 and the shredder member 24.

The housing 12 may be formed of any suitable material, such as aluminum of steel, and may be of any suitable construction or shape in accordance with the principles of the present invention. The wheels 18 preferably are rotatably mounted adjacent the corners of the housing by a pair of axles 30 which extend through apertures in opposite sides of the housing. Each of the wheels 18 may be formed of any suitable material and may be of any suitable size or construction. As shown in FIG. 3, the wheels 18 may be mounted and secured in different vertically spaced notches 32 in the housing side wall 16 for the purpose of varying the cutting height of the mower 10. The height of the housing 12 relative to the wheels 18 may be adjusted in any other suitable manner.

The power means 20 may be any suitable type of gasoline engine or electric motor, or any other suitable type of power means. Also, power may be transferred from the power means 20 to the cutter member 22 and the shredder member 24 by any suitable drive transfer means. As an illustrative example, the power means 20 may comprise one or more pulleys 34 which are drivingly connected by belts 36 and 38 to pulleys 40 and 42 for the cutter member 22 and the shredder member 24, respectively. If it is desired to propel the mower 10 with the power means 20, the power means may be drivingly connected to the front wheels or rear wheels 18 of the mower in any suitable manner. As an illustrative example, a drive belt 44 could connect another pulley on shaft 74 on the shredder member 24 with a pulley 46 connected to one of the rear wheels 18 of the axle 30 thereof, for the purpose of transferring the drive from the power means to the rear wheels. In order to selectively control the drive of the rear wheels, the belt 44 could be of a size sufficiently large so that it will slip without being tensioned between the pulleys 42 and 46. For the purpose of tensioning the belt 44 so as to drive the rear wheels, a belt tensioning lever 48 having rollers 50 could be movably mounted on the housing 12, in the manner shown in FIG. 1. If desired, a biasing means such as a spring 52 could be provided to normally urge the lever 48 to the belt tensioning or driving position. When it is desired to terminate the drive to the rear wheels 18, the lever 48 is pivoted forwardly against the force of the spring 52 and locked in a release position behind any suitable type of stop or lock means 54 mounted on the upper wall 14 of the housing 12. The lever 48 could be provided with any suitable type of remote control means such as the flexible cable 55 shown in FIG. 1 which is connected to a control lever or the like (not shown) mounted on the handle 26.

Preferably the pulleys 40, 42 and 46 are enclosed by one or more cover plates 57 removably secured to the housing side wall 16 in any suitable manner, such as by screws 59, as shown in FIG. 2.

The reel-type cutter member 22 may be of any suitable or conventional construction. The cutter member 22 generally comprises a center shaft 56 extending transversely of the longitudinal axis of the housing and being rotatably mounted on opposite side walls 16 of the housing. A plurality of generally helical cutting blades 58 are circumferentially spaced around the center shaft 56 and are secured to intermediate annular plates 60 and annular end plates 62 that are secured by ribs 64 to the center shaft 56. The blades 58 and other component parts of the reel-type cutter member 22 may be formed of any suitable material.

Figure 5:
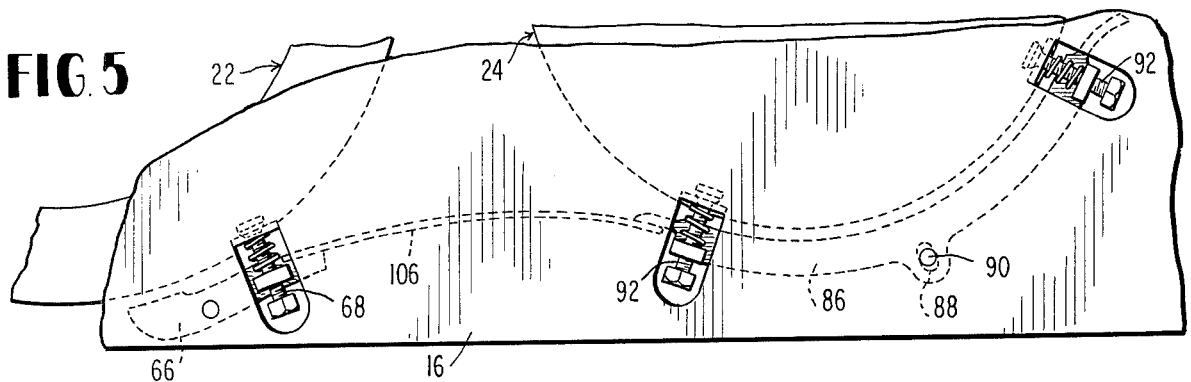
FIG. 5 is an enlarged partial elevational view, with parts broken away, showing the adjusting means for the shear plate and shredder plate of the lawn mower of the present invention.
Figure 6:
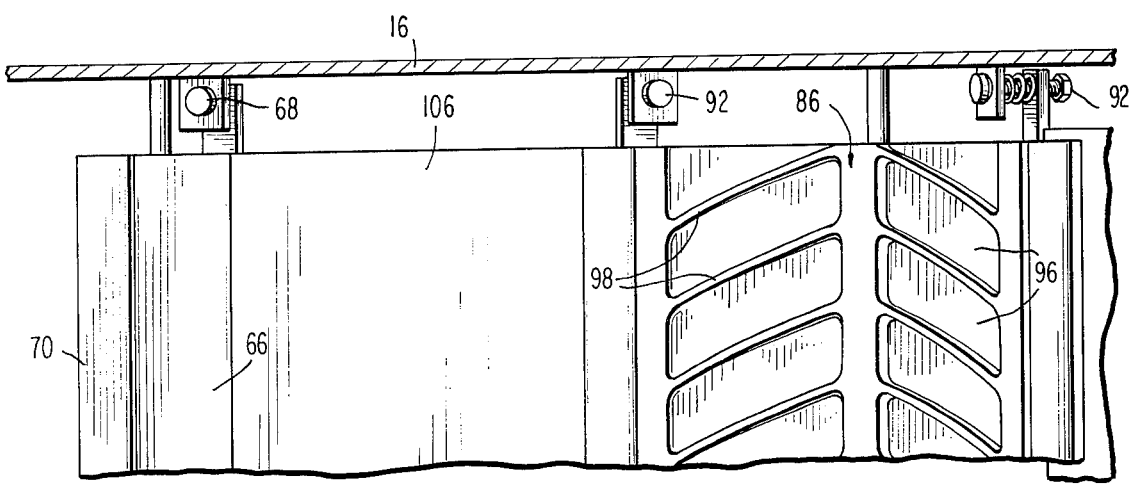
FIG. 6 is an enlarged top plan view, with parts broken away, showing portions of the shear plate for the cutting member, the subhousing and the shredder plate of the lawn mower of the present invention.
Figure 6:
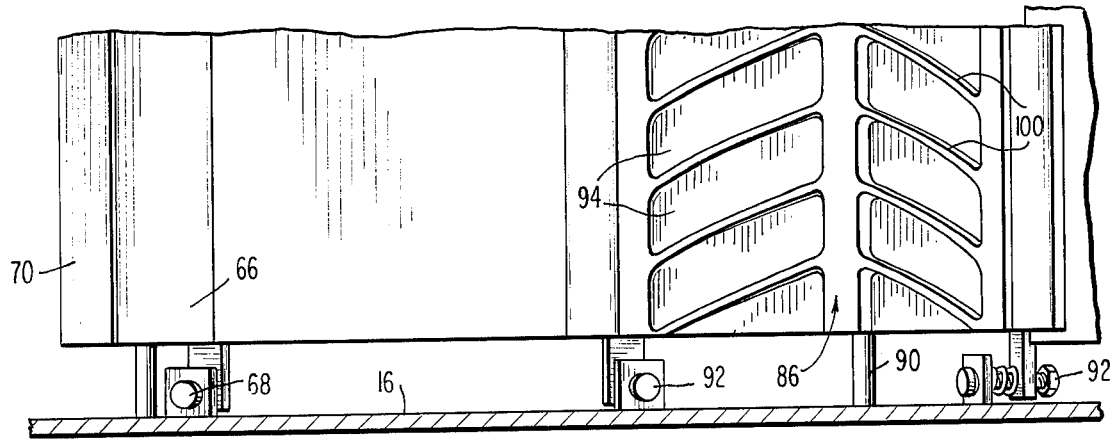

A sheer plate 66 is positioned adjacent the lower portion of the cutter member 22. The shear plate 66 extends across the housing and is pivotally mounted at its ends on the opposite side walls 16 of the housing so as to be adjustable relative to the cutter blades 58. The pivotal adjustment of the sheer plate 66 may be effected in any suitable manner, such as by the use of screw-type adjusting means 68 of any suitable construction mounted on opposite sides of the housing side walls 16 and adapted to engage extensions connected to the shear plate 66, as shown in FIGS. 1, 5 and 6. The cutting or shearing edge portion 70 of the shear plate 66 may be removable so as to provide for the replacement of same when it becomes unduly worn. The edge portion 70 may be removably mounted on the shear plate 66 in any suitable manner, such as by one or more bolts 72. Alternatively, the sheer plate 66 could be mounted on a pivotal rod having its ends mounted off center on the housing 16. In this manner, rotation of the rod would cause the shear plate to move upwardly or downwardly, as desired.

Figure 4:
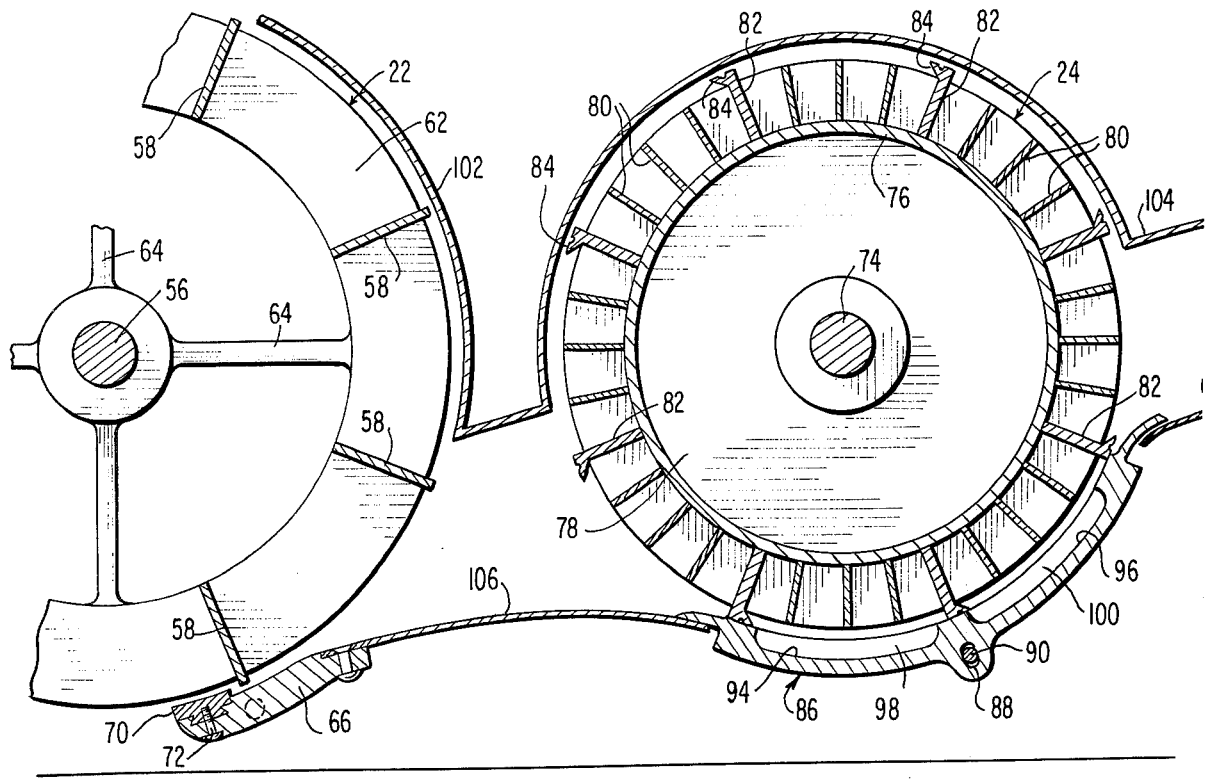
FIG. 4 is an enlarged partial elevational view, in section and with parts broken away, showing the cutting and shredding members of the lawn mower of the present invention.

As shown in FIGS. 2 through 4, the shredder member 24 generally comprises a central shaft 74 rotatably mounted on opposite side walls 16 of the housing 12, and a cylindrical wall 76 surrounding the shaft 74 and mounted thereon or secured thereto in any suitable manner, such as by end walls 78. Secured to the walls 76 and extending generally radially outwardly therefrom are a plurality of fins or vane members 80 disposed in circumferentially spaced relation around the wall 76. The vane members 80 may be of any suitable number and shape, and may be spaced along the outer surface of the wall 76 in any suitable manner. A plurality of shredder blades 82 also are mounted in circumferentially spaced relation along the outer surface of the cylindrical wall 76 and extend substantially radially outwardly therefrom. The shredder blades 82 may be of any suitable number, size or shape, and preferably are provided at their outer portions with a tapered leading edge 84 for the purpose of facilitating the shredding and removal of grass cuttings in a manner to be more fully described hereinafter. The vane members 80, shredder blades 82 and other components of the shredder member 24 may be formed of any suitable materials.

Disposed beneath the shredder member 24 is a shredder bed or plate 86 which is mounted on the housing 12 for substantially vertical adjustment relative to the shredder member 24. As shown in FIG. 4, the shredder bed 86 is generally arcuate in shape and is provided with a central elongated opening 88 through which a support shaft 90 extends, the support shaft 90 being mounted on opposite side walls 16 of the housing 12.

Since the opening 88 is elongated, it enables the shredder plate 86 to be moved toward or away from the shredder member blades 82 and also to be pivoted about the support shaft 90. In this manner, the proper engagement between the upper surface of the shredder bed 86 and the shredder blades 82 for maximum shredding of the grass cuttings can always be maintained. As an illustrative example, the shredder bed 86 may be moved relative to the support shaft 90 and to the shredder member 24 by any suitable adjusting means, such as the screw-type adjusting means 92 shown in FIGS. 1, 5 and 6. These adjusting means 92 preferably are mounted on opposite side walls 16 of the housing 12 and are in engagement with end portions of the shredder bed 86 which are disposed inwardly of the housing side walls 16. The adjusting means 92 may be the same in construction and operation as the adjusting means 68 for the shear plate 66.

Figure 7:
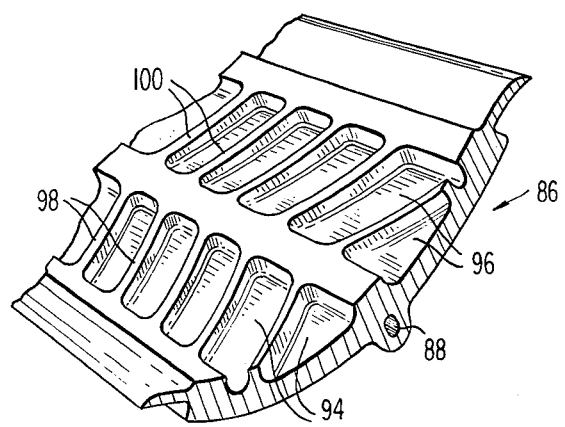
FIG. 7 is a perspective view, with parts broken away, of a portion of the shredder plate of the lawn mower of the present invention.

The upper surface of the shredder bed 86 is recessed at 94 and 96 to provide a plurality of ribs 98 and 100, respectively, which extend at angles to the shredder blades 82 of the shredder member 24. As shown in FIGS. 6 and 7, preferably the set of substantially parallel ribs 98 extends in a direction that is different from the set of the substantially parallel ribs 100, and both sets of ribs extend at an angle to the shredder blades 82. In this manner, the shredding of grass cuttings is maximized. It is noted, however, that the upper surface of the shredder bed 86 may be of any suitable configuration other than that shown in the drawings for the purpose of effecting the shredding of grass cuttings in cooperation with the shredder blades 82 of the shredder member 24. The tapered leading edges 84 of the shredder blades 82 serve to promote shredding of grass cuttings when in engagement with the upper surface of the shredder bed 86, and also serve to remove shredded grass cuttings from the shredder bed.

As shown in FIGS. 3 and 4, a subhousing portion 102 mounted within the housing 12 closely surrounds the upper portion of the cutter member 22 and the shredder member 24. At the rear portion of the shredder member 24, the subhousing portion 102 merges with the upper wall of a discharge tube or chute 104 extending to the rear portion of the housing 12 and terminating at an opening in the rear side wall 16 of the housing. In this manner, the upper portions of both the cutter member 22 and the shredder member 24 are enclosed by the subhousing portion 102.

The lower portions of the cutter member 22 and the shredder member 24 are partially surrounded and enclosed by the shear plate 66 and the shredder bed 86, respectively. In addition, the space between the lower portions of the cutter member 22 and the shredder member 24 is enclosed by another subhousing portion in the form of a plate or wall member 106 extending rearwardly from the shear plate 66 to the shredder bed 86 and connected thereto in any suitable manner.

Owing to the enclosure of the cutting member 22, the shredder member 24 and the space therebetween by the subhousing 102, 106, the vane members 80 on the shredder member 24 serve to create a rearward air flow within this enclosure when the cutting member 22 and the shredder member 24 are rotated by the power means 20 in counterclockwise directions as seen in FIGS. 3 and 4. This rearward air flow serves to create a suction action within the subhousing 102, 106 which causes grass to be lifted adjacent the front of the shear plate 66 so that it is uniformly cut by the blades 58 of the cutter member 22. The grass cuttings are then sucked into the subhousing 102, 106 and moved rearwardly between the shredder member 24 and the shredder bed 86 where they are shredded by the engagement of the shredder blades 82 with the upper surface of the shredder bed 86. Thereafter, the shredded grass cuttings are blown rearwardly by the air flow created by the vane members 80 through the discharge chute 104 and out the opening in the rear side wall 16 of the mower housing 12. The shredded grass cuttings may be discharged directly onto the lawn at the rear of the mower for the purpose of serving as a mulch or, alternatively, may be received in a grass catcher (not shown) removably mounted on the rear of the mower. So that the shredded grass cuttings will be directed downwardly, the discharge chute 104 could terminate in a downwardly directed end portion (not shown).

As shown in FIG. 2, one side wall 16 of the housing 12 is positioned in substantial alignment with the outer edge portions of the wheels 18, and the ends of the cutter member 22 and the shredder member 24 adjacent thereto are also positioned in substantial alignment with the outer edge portions of the wheels 18. In this manner, it is possible with the use of the present lawn mower to cut close to fence lines, trees or buildings.

From the foregoing description, it will be readily apparent that the lawn mower of the present invention has significant advantages over those now in common use. It is capable of uniformly cutting long or short grass, effectively shreds the grass cuttings, is safe in operation, is relatively simple in construction and operation, and is attractive in appearance.

What is claimed is:

1. A lawn mower comprising:
   a housing supported by a plurality of wheels, said housing having a top wall and depending side walls,
   power means mounted on said top wall of said housing,
   reel-type cutting means disposed within said housing, said cutting means extending substantially transversely to the direction of travel of said mower and being rotatably mounted on opposite side walls of said housing,
   shredder means disposed within said housing rearwardly of said cutting means, said shredder means being rotatably mounted on opposite side walls of said housing and having vane means for creating a rearward air flow during rotation of said shredder means,
   means for drivingly connecting said cutting means and said shredder means to said power means,
   subhousing means mounted within said housing and substantially enclosing said cutting means and said shredder means, and
   discharge means mounted within said housing for guiding shredded grass cuttings rearwardly from said shredder member to the exterior of said housing,
   whereby rotation of said cutting means and said shredder means serves to create a rearward air flow in said subhousing means to lift grass for uniform cutting by said cutting means and to move the grass cuttings rearwardly to said shredder means and then rearwardly through said discharge means.

2. The lawn mower of claim 1 wherein a shear plate is positioned beneath said cutting means and is adjustably mounted on opposite side walls of said housing.

3. The lawn mower of claim 1 wherein said shear plate has a replaceable cutting edge portion.

4. The lawn mower of claim 1 wherein a shredder bed is disposed beneath said shredder means and is adjustably mounted on opposite side walls of said housing.

5. The lawn mower of claim 4 wherein said shredder means comprises a plurality of shredder blades extending substantially transversely to the direction of travel of the mower, and said shredder bed is so positioned that its upper surface is engaged by said shredder blades to shred the grass cuttings received therebetween.

6. The lawn mower of claim 5 wherein the upper surface of said shredder bed is formed with recessed portions so as to define a plurality of ribs extending at an angle to said shredder blades.

7. The lawn mower of claim 4 wherein a subhousing portion extends from said shear plate to said shredder bed to form the lower portion of said subhousing means enclosing said cutter means and said shredder means.

8. The lawn mower of claim 1 wherein the upper portion of said subhousing means closely surrounds the upper portions of said cutter member and said shredder member.

9. The lawn mower of claim 1 wherein said discharge means comprises a discharge chute extending from said subhousing means rearwardly to the rear side wall of said housing.

10. The lawn mower of claim 1 wherein one side wall portion of said housing and the adjacent end portions of said cutter member and said shredder member terminate near the outer surface of the adjacent wheels on one side of the housing, thereby enabling the cutting of grass close to objects such as fence lines, trees or buildings.

11. The lawn mower of claim 1 wherein said shredder means comprises a plurality of elongated cutter blades extending substantially transversely to the direction of travel of the mower and being disposed in substantially circumferentially spaced relation, and wherein said vane means comprise a plurality of elongated vane members extending substantially transversely to the direction of travel of the mower and being disposed in substantially circumferentially spaced relation between said shredder blades.

12. The lawn mower of claim 11 wherein each of said shredder blades has a downwardly and outwardly tapered leading edge.

* * * * *